United States Patent [19]
Hayashi et al.

[11] Patent Number: 5,742,576
[45] Date of Patent: Apr. 21, 1998

[54] DIGITAL SIGNAL REPRODUCING APPARATUS

[75] Inventors: Hideki Hayashi; Masaru Umezawa; Hideki Kobayashi, all of Tsurugashima, Japan

[73] Assignee: Pioneer Electronic Corporation, Tokyo, Japan

[21] Appl. No.: 663,780

[22] Filed: Jun. 14, 1996

[30] Foreign Application Priority Data

Jun. 15, 1995 [JP] Japan .................................. 7-148909

[51] Int. Cl.⁶ ............................................... G11B 7/00
[52] U.S. Cl. ....................... 369/59; 369/124; 369/47; 360/39
[58] Field of Search ................................ 369/59, 47, 48, 369/49, 50, 54, 58, 32, 124; 360/48, 53, 39, 40, 46

[56] References Cited

U.S. PATENT DOCUMENTS 5,455,813  10/1995  Hayashi .................................. 369/59
5,506,827   4/1996  Tobita .................................... 369/59

*Primary Examiner*—Muhammad N. Edun
*Attorney, Agent, or Firm*—Finnegan, Henderson, Farabow, Garrett & Dunner, L.L.P.

[57] ABSTRACT

A digital signal reproducing apparatus which can reproduce a digital signal by a sampling clock that is accurately synchronized with a phase of a read signal. A sample value near the zero level is extracted from a sample value sequence obtained by sampling the read signal. When a sample value level of the sample value sequence has a rising tendency, a sampling clock whose phase is corrected on the basis of one of the extracted sample value and an inversion extracted sample value obtained by inverting a polarity of the extracted sample value is generated. When the sample value level of the sample value sequence has a falling tendency, a sampling clock whose phase is corrected on the basis of the other one of the extracted sample value and the inversion extracted sample value is generated.

4 Claims, 8 Drawing Sheets

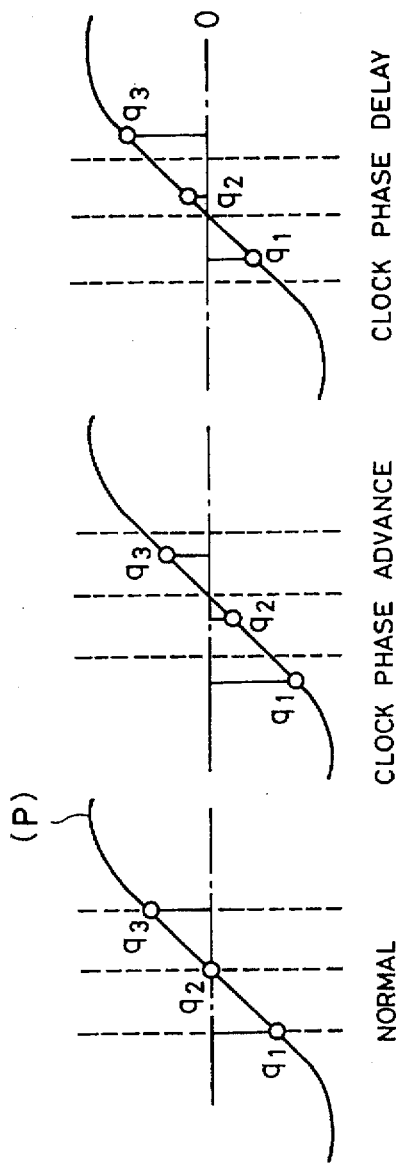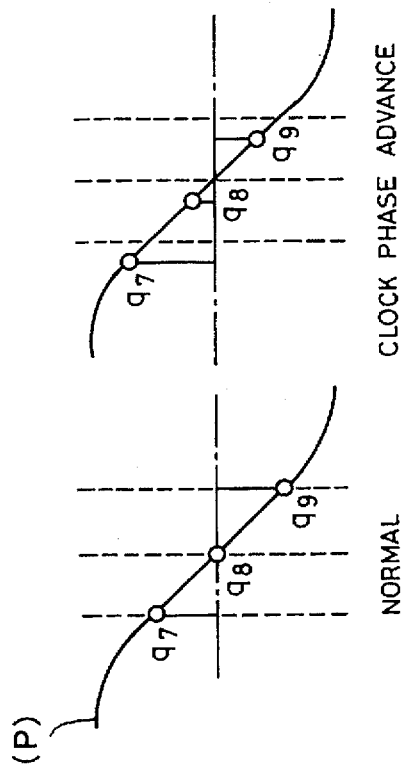

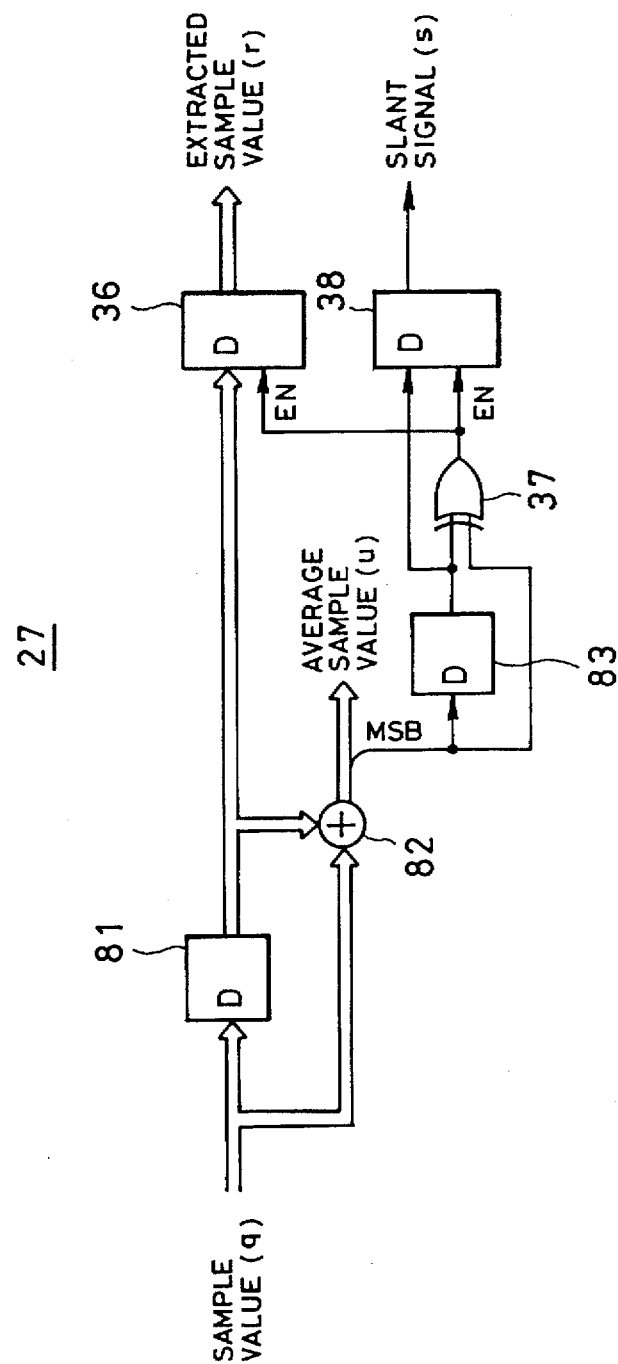

DIGITAL SIGNAL REPRODUCING APPARATUS

BACKGROUND OF THE INVENTION

1. Field of the Invention

The invention relates to an apparatus for reproducing a digital signal recorded on a recording medium.

2. Description of Background Information

With the realization of a large capacity of data recording, high-density recording of the recording information is performed increasingly. When the recording information is reproduced from the recording medium on which data is recorded at a high density as mentioned above, the waveform of a resultant reproduction signal is, however, significantly subjected to waveform interference. This leads to a problem of an increased error rate at the time of decoding of the reproduction signal.

Hence, there has been proposed a method, wherein a Viterbi decoding is performed to the reproduction signal which is subjected to a waveform interference as mentioned above, so that an error rate at the time of the decoding is reduced.

FIG. 1 is a diagram showing a construction of a such digital signal reproducing apparatus 20 having a Viterbi decoder.

In FIG. 1, an information reading apparatus 1 comprises a rotation driving unit 3 for rotating a recording disc 2 on which a digital information signal has been recorded at a high density, and a pickup 4 for supplying a read signal derived by reading recording information recorded on the recording disc 2 to the digital signal reproducing apparatus 20.

An equalizer 21 amplifies the read signal supplied from the information reading apparatus 1 in accordance with equalizing characteristics suitable for a clock signal and for supplying a signal derived by eliminating noises to a pulse forming circuit 23. On the basis of a comparison result between a signal level of the supplied signal and a predetermined reference voltage, the pulse forming circuit 23 forms pulses from the supplied signal and supplies the pulse signal obtained in this instance to a clock generating circuit 24. The clock generating circuit 24 generates a clock signal whose phase is synchronized with that of the supplied pulse signal and supplies the clock signal as a sampling clock signal to an A/D converter 25. An equalizer 22 amplifies the read signal by equalizing characteristics suitable for a data discrimination, eliminates noises, and supplies the resultant signal to the A/D converter 25. At the timing of the supplied sampling clock signal, the A/D converter 25 supplies sample values obtained by sampling the signal supplied from the equalizer 22 to a Viterbi decoder 26. The Viterbi decoder 26 observes the supplied sample values as a sequence and outputs a binary decoding data sequence of the highest existence probability as a reproduction digital signal for the input sample value sequence.

As mentioned above, in the digital signal reproducing apparatus, the dedicated equalizers 21 and 22 for waveform equalization are needed for a data signal system and a clock signal forming system, respectively. A delay of the clock signal forming system comprising the equalizer 21, pulse forming circuit 23, and clock generating circuit 24 and a delay by the equalizer 22 as a data signal system don't always coincide. In order to obtain a sampling clock signal synchronized with a phase of the read signal at a high precision, therefore, a delay adjusting circuit for equalizing the delays of the data signal system and clock signal forming system is needed.

When a delay of each circuit changes due to a factor of a temperature change or the like, however, since it is impossible to cope with a delay adjustment in the delay adjusting circuit as mentioned above, there arises a problem that the sampling clock signal synchronized with the phase of the read signal cannot be obtained.

OBJECT AND SUMMARY OF THE INVENTION

The invention has been made to solve the above problems, and it is an object of the invention to provide a digital signal reproducing apparatus which is able to reproduce a digital signal by a sampling clock that is accurately synchronized with a phase of a read signal.

According to the invention, there is provided a digital signal reproducing apparatus for reproducing a digital signal from a read signal read out from a recording medium on which the digital signal has been recorded, comprising: an A/D converter for sequentially sampling the read signal by sampling clocks, thereby obtaining a sample value sequence; decoding means for decoding the digital signal from the sample value sequence and outputting the decoded signal as a reproduction digital signal; sample extracting means for extracting sample values near a zero level from the sample values in the sample value sequence, thereby obtaining it as an extracted sample value; polarity switching means for setting one of the extracted sample value and an inversion extracted sample value obtained by inverting a polarity of the extracted sample value to a phase error signal in the case where a sample value level of the sample value sequence has a rising tendency and for setting the other one of the extracted sample value and the inversion extracted sample value to the phase error signal in the case where the sample value level of the sample value sequence has a falling tendency; and clock generating means for generating a clock signal whose phase is corrected on the basis of the phase error signal as a sampling clock.

The sample values near the zero level are extracted from the sample value sequence obtained by sampling the read signal. When the sample value level of the sample value sequence has a rising tendency, the sampling clock whose phase is corrected on the basis of one of the extracted sample value and the inversion extracted sample value obtained by inverting the polarity of the extracted sample value is generated. When the sample value level of the sample value sequence has a falling tendency, the sampling clock whose phase is corrected on the basis of the other one of the extracted sample value and the inversion extracted sample value is generated.

BRIEF DESCRIPTION OF THE DRAWINGS

FIGS. 7A to 7F are diagrams for explaining the phase correcting operation of a sampling clock (v) by a phase error signal (t);

FIG. 8 is a diagram showing an internal construction according to another embodiment of the sample value extracting circuit 27.

DETAILED DESCRIPTION OF THE EMBODIMENT

An embodiment of the invention will now be described hereinbelow.

Figure 1:
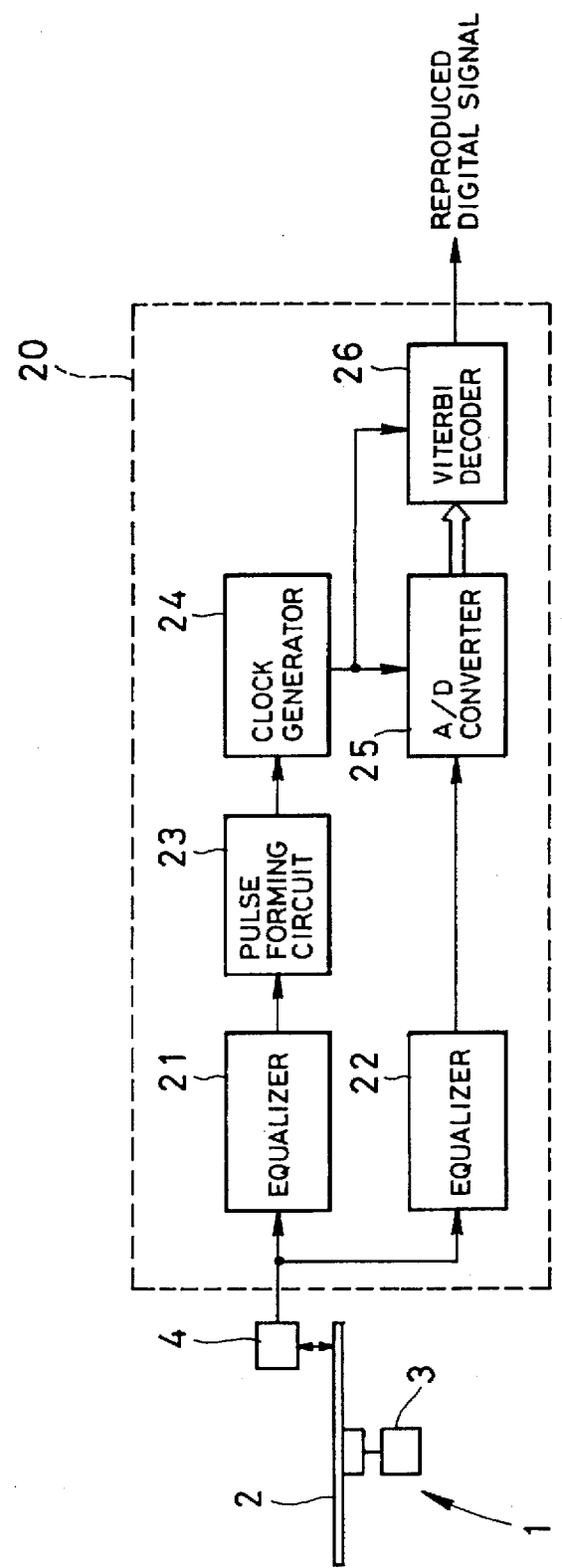
FIG. 1 is a diagram showing a construction of a conventional digital signal reproducing apparatus.
Figure 2:
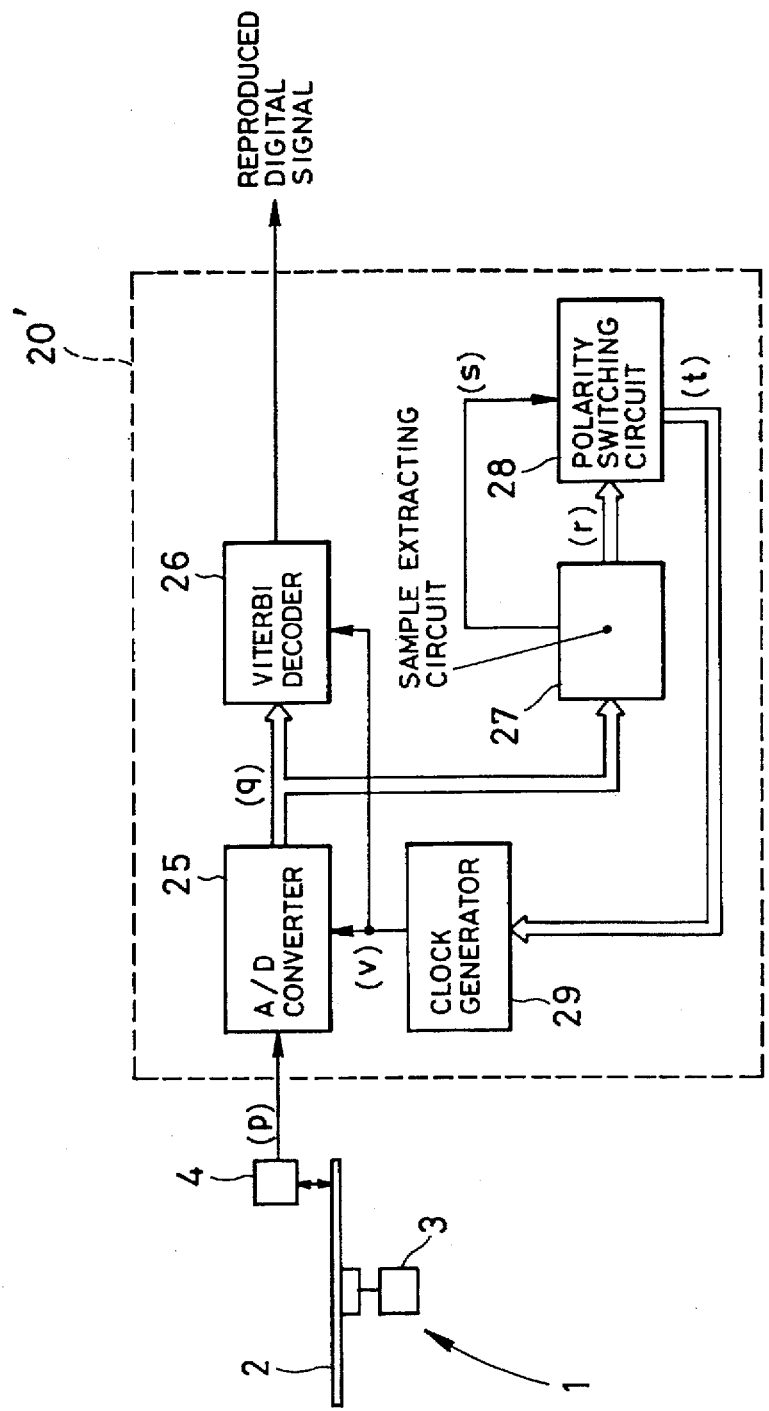
FIG. 2 is a diagram showing a construction of a digital signal reproducing apparatus according to the invention.

FIG. 2 is a diagram showing a construction of a digital signal reproducing apparatus 20' according to the invention.

In FIG. 2, the information reading apparatus 1 is constituted by: the rotation driving unit 3 for rotating the recording disc 2 on which a digital information signal has been recorded at a high density; and the pickup 4 for supplying a read signal (p) obtained by reading recording information recorded on the recording disc 2 to the digital signal reproducing apparatus 20'.

The read signal (p) supplied from the information reading apparatus 1 is supplied to the A/D converter 25 of the digital signal reproducing apparatus 20'. The A/D converter 25 samples the read signal (p) at a timing of a sampling clock (v) that is supplied from a clock generating circuit 29 and supplies sample values (q) obtained in this instance to the Viterbi decoder 26 and a sample value extracting circuit 27.

The Viterbi decoder 26 sequentially fetches the sample value (q) at every timing of the sampling clock (v) and observes the fetched sample values (q) as a sequence. The Viterbi decoder 26 outputs a decoding data sequence of the highest existence probability for the input sample value sequence as a reproduction digital signal.

In a zero-cross interval during which the sample value (q) which is supplied from the A/D converter 25 at every timing of the sampling clock (v) is shifted from the positive value to the negative value or from the negative value to the positive value, a sample value extracting circuit 27 extracts the sample value in which the value of the sample value (q) is most close to the 0 level and supplies as an extracted sample value (r) to a polarity switching circuit 28.

The sample value extracting circuit 27, further, forms a slant signal (s) indicating whether the extracted sample value (r) has been obtained during a period of rising tendency of a shift change in sample value (q) or during a period of falling tendency and supplies to the polarity switching circuit 28.

Figure 3:
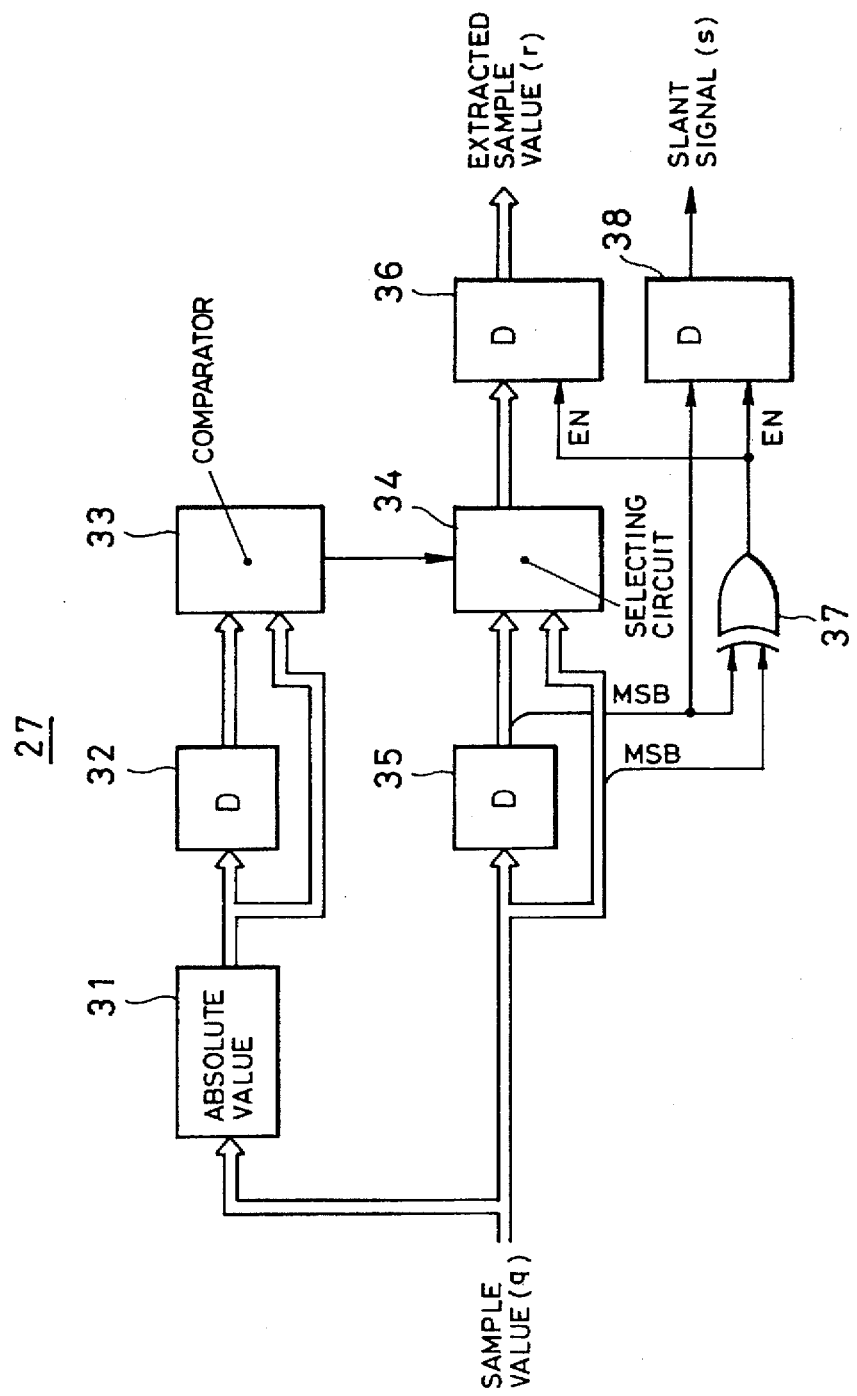
FIG. 3 is a diagram showing an example of an internal construction of a sample value extracting circuit 27.

FIG. 3 is a diagram showing an example of an internal construction of the sample value extracting circuit 27.

In FIG. 3, an absolute value circuit 31 obtains the absolute value of the sample value (q) supplied and transfers it as a sample absolute value to a D flip-flop 32 and a comparator 33. Although not shown, the sampling clock (v) is supplied to a clock terminal of the D flip-flop 32. The D flip-flop 32 delays the sample absolute value that is supplied from the absolute value circuit 31 by a time corresponding to only one sampling clock and supplies the delayed value to the comparator 33.

The comparator 33 compares the sample absolute value which is supplied from the absolute value circuit 31 with the sample absolute value that is supplied with a delay corresponding to only one sampling clock. The comparator 33 supplies a comparison result signal indicative of a comparison result to a selecting circuit 34. For example, when it is judged that the sample absolute value which is supplied from the absolute value circuit 31 is larger than the sample absolute value which is supplied with the delay of only the one sampling clock, the comparator 33 supplies a comparison result signal of a logic value "0" to the selecting circuit 34. When it is judged that the sample absolute value which is supplied from the absolute value circuit 31 is smaller than the sample absolute value which is supplied with the delay of only the one sampling clock, the comparator 33 supplies a comparison result signal of a logic value "1" to the selecting circuit 34. Although not shown, the sampling clock (v) is supplied to a clock terminal of the D flip-flop 35. The D flip-flop 35 delays the sample value (q) which is supplied from the A/D converter 25 by a time of only one sampling clock and supplies a resultant delayed sample value to the selecting circuit 34.

When the comparison result signal of the logic value "0" is supplied from the comparator 33, the selecting circuit 34 supplies the delayed sample value which was delayed by the D flip-flop 35 by the time of only one sampling clock to a D flip-flop 36. When the comparison result signal of the logic value "1" is supplied from the comparator 33, the selecting circuit 34 supplies the sample value (q) which is supplied from the A/D converter 25 to the D flip-flop 36 as it is.

Namely, the comparator 33 and selecting circuit 34 compare the magnitudes of the two adjacent (with respect to the sampling timing) sample values (q) from a sample value sequence which is sequentially supplied from the A/D converter 25, select the sample value of the smaller absolute value, and supply to the D flip-flop 36.

When a logic value of the MSB (most significant bit) of the sample value (q) doesn't coincide with a logic value of the MSB of the delayed sample value which has been delayed by the time of only one sampling clock by the D flip-flop 35, an exclusive OR circuit 37 supplies an enable signal of the logic value "1" to each of D flip-flops 36 and 38. When both of those logic values coincide, the exclusive OR circuit 37 supplies an enable signal of the logic value "0" to each of the D flip-flops 36 and 38. In this instance, now assuming that the sample value (q) has been expressed by a binary value of an offset binary, when the MSB of the sample value (q) is set to the logic value "0", the sample value (q) has a negative value. When the MSB is set to the logic value "1", the sample value (q) has a positive value. Namely, when the logic value of the MSB of the sample value (q) doesn't coincide with the logic value of the MSB of the delayed sample value which was delayed by the time of only one sampling clock by the D flip-flop 35, this means that the apparatus is in a state in which the sample value (q) is shifted from the positive value to the negative value or from the negative value to the positive value, so called a zero-cross state. Namely, the exclusive OR circuit 37 operates as zero-cross detecting means for supplying the enable signal of the logic value "1" to each of the D flip-flops 36 and 38 when the zero-cross state is detected.

Only when the enable signal of the logic value "1" is supplied from the exclusive OR circuit 37, the D flip-flop 36 fetches the sample value supplied from the selecting circuit 34 and produces it as an extracted sample value (r).

Only when the enable signal of the logic value "1" is supplied from the exclusive OR circuit 37, the D flip-flop 38 fetches the MSB of the delayed sample value supplied from the D flip-flop 35 and produces it as a slant signal (s). In this instance, in the case where the sample value (q) is shifting from the positive value to the negative value, namely, in the case where a shift change of the sample value (q) has a falling tendency, the signal logic value of the slant signal (s)

is set to "1". When the sample value (q) is shifting from the negative value to the positive value, that is, when the shift change of the sample value (q) has a rising tendency, the signal logic value of the slant signal (s) is set to "0".

When the signal logic value of the slant signal (s) is set to "0", the polarity switching circuit 28 in FIG. 2 supplies the extracted sample value (r) supplied from the sample value extracting circuit 27 to the clock generating circuit 29 as a phase error signal (t) as it is. When the signal logic value of the slant signal (s) is equal to "1", the polarity switching circuit 28 supplies the inversion extracted sample value obtained by inverting the polarity of the extracted sample value (r) supplied from the sample value extracting circuit 27 to the clock generating circuit 29 as a phase error signal (t).

Figure 4:
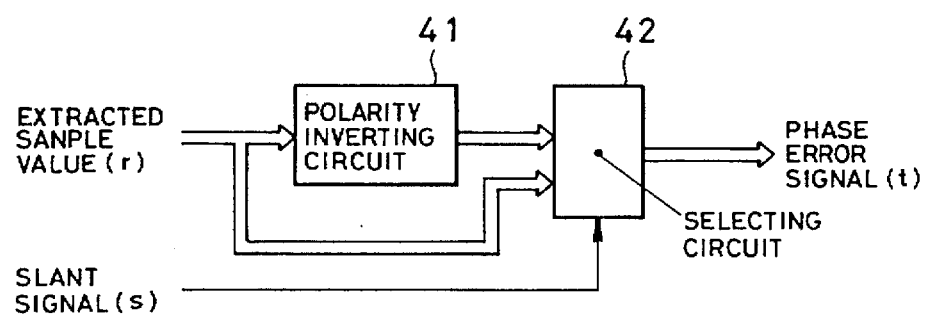
FIG. 4 is a diagram showing an example of an internal construction of a polarity switching circuit 28.

FIG. 4 is a diagram showing an example of an internal construction of the polarity switching circuit 28.

In FIG. 4, a polarity inverting circuit 41 inverts the polarity of the extracted sample value (r) supplied from the sample value extracting circuit 27 and supplies to a selecting circuit 42. The polarity inverting circuit 41 inverts the polarity of the extracted sample value (r) by adding "1" to the value obtained by inverting the logical values of all bits of the extracted sample value (r). In the case where the signal logic value of the slant signal (s) supplied from the sample value extracting circuit 27 is equal to "0", the selecting circuit 42 selects the extracted sample value (r) supplied from the sample value extracting circuit 27 and produces it as a phase error signal (t). When the signal logic value of the slant signal (s) is equal to "1", the selecting circuit 42 selects the sample value whose polarity is inverted by the polarity inverting circuit 41 and produces it as a phase error signal (t).

That is, in the case where the shift change of the sample value (q) has a rising tendency, the polarity switching circuit 28 supplies the extracted sample value (r) to the clock generating circuit 29 as a phase error signal (t) as it is. When the transitional change of the sample value (q) has a falling tendency, the polarity switching circuit 28 supplies the inversion extracted sample value obtained by inverting the polarity of the extracted sample value (r) to the clock generating circuit 29 as a phase error signal (t).

The clock generating circuit 29 generates the sampling clock (v) whose phase is corrected on the basis of the phase error signal (t) and supplies it to the A/D converter 25 and the Viterbi decoder 26, respectively.

Figure 5:
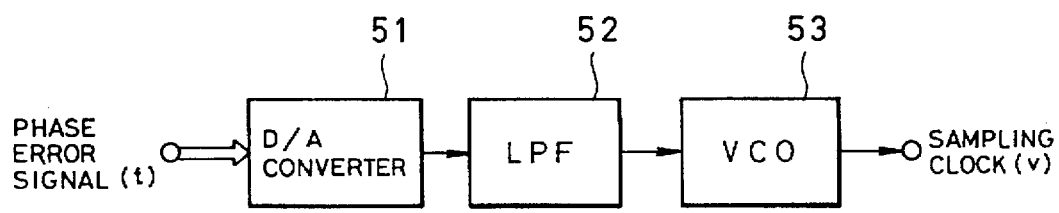
FIG. 5 is a diagram showing an example of an internal construction of a clock generating circuit 29.

FIG. 5 is a diagram showing an internal construction of the clock generating circuit 29.

In FIG. 5, a D/A converter 51 converts the phase error signal (t) to an analog voltage and supplies to an LPF (low pass filter) 52. The LPF 52 averages the supplied analog voltage and transmits the average value to a VCO (voltage controlled oscillator) 53. The VCO 53 generates the sampling clock (v) having an oscillating frequency according to the average analog voltage supplied from the LPF 52.

Figure 6:
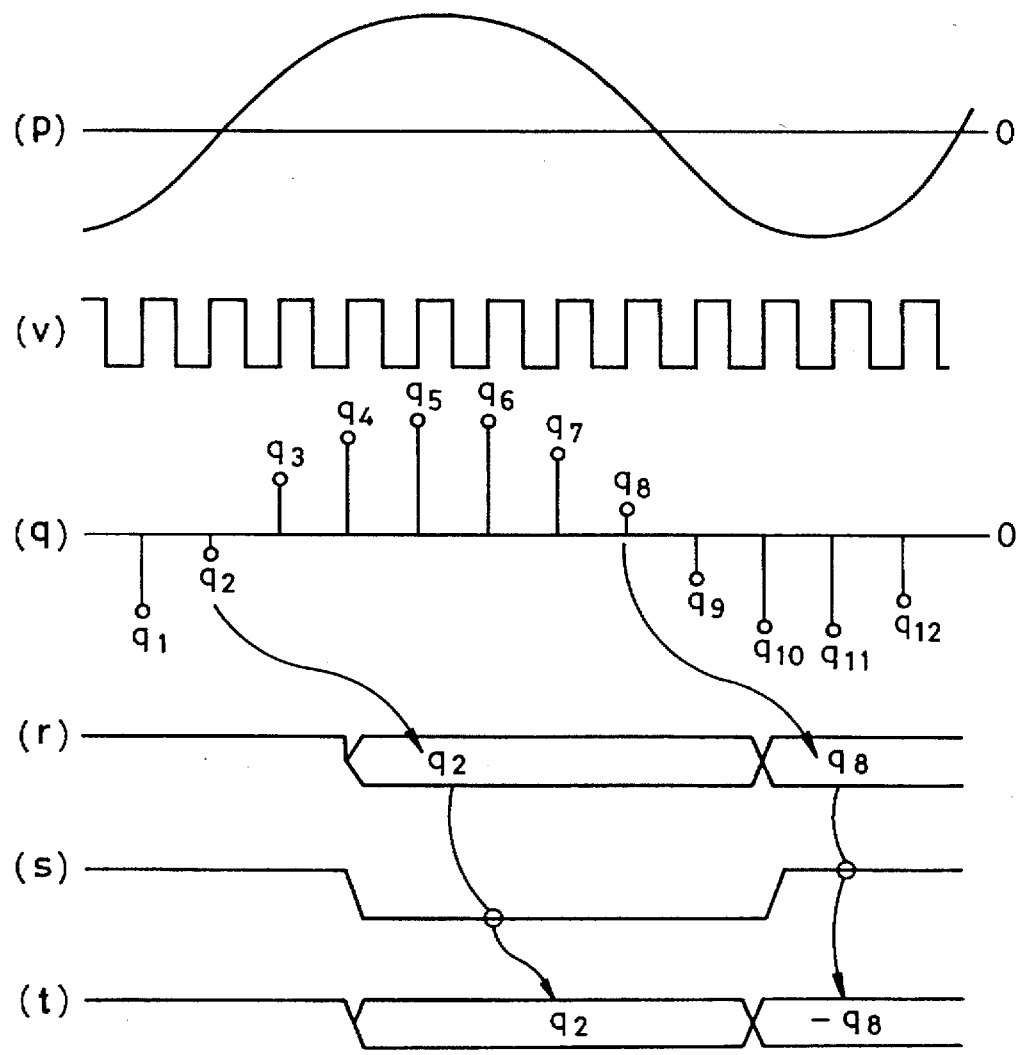
FIG. 6 is a diagram showing the operation by the digital signal reproducing apparatus of the invention.

FIG. 6 is a waveform diagram showing an example of the operation by the digital signal reproducing apparatus 20' shown in FIGS. 2 to 5 as mentioned above.

In FIG. 6, the read signal (p) is A/D converted at every timing of the sampling clock (v) and becomes a sequence of sample values $q_1$ to $q_{12}$.

First, in the sequence of the sample values $q_1$ to $q_{12}$, in a shift from the sample value $q_2$ to $q_3$, the sample value changes from the negative value to the positive value. In this instance, when comparing the absolute values of the sample values $q_2$ and $q_3$, the absolute value of the sample value $q_2$ is smaller, in other words, the sample value $q_2$ is closer to the 0 level. The sample value extracting circuit 27, therefore, produces the sample value $q_2$ as an extracted sample value (r). Further, since the shift from the sample value $q_2$ to the sample value $q_3$ has a rising tendency, the sample value extracting circuit 27 sets the signal logic value of the slant signal (s) to "0". In this instance, since the signal logic value of the slant signal (s) is equal to "0", the polarity switching circuit 28 supplies the extracted sample value $q_2$ to the clock generating circuit 29 as a phase error signal (t) as it is.

Subsequently, in the shift from the sample value $q_8$ to the sample value $q_9$, the sample value changes from the positive value to the negative value. At this time, when comparing the absolute values of the sample values $q_8$ and $q_9$, since the absolute value of the sample value $q_8$ is smaller, namely, since the sample value $q_8$ is closer to the 0 level, the sample value extracting circuit 27 produces the sample value $q_8$ as an extracted sample value (r). Further, since the shift from the sample value $q_8$ to the sample value $q_9$ has a falling tendency, the sample value extracting circuit 27 sets the signal logic value of the slant signal (s) to "1". At this time, since the signal logic value of the slant signal (s) is equal to "1", the polarity switching circuit 28 supplies the signal obtained by inverting the polarity of the extracted sample value $q_8$ to the clock generating circuit 29 as a phase error signal (t).

In this instance, the clock generating circuit 29 generates the sampling clock (v) whose phase was corrected on the basis of the sample values $q_2$ and $(-q_8)$.

The phase correcting operation of the sampling clock (v) by the phase error signal (t) will now be described with reference to FIGS. 7A to 7F.

FIGS. 7A to 7C, in this instance, show the phase correcting operations which are executed in accordance with three continuous sample values $q_1$ to $q_3$ showing the rising tendency as shown in FIG. 6. FIGS. 7D to 7F show the phase correcting operations which are executed in accordance with three continuous sample values $q_7$ to $q_9$ showing the falling tendency as shown in FIG. 6. In FIGS. 7A to 7F, a broken line shows a timing position of the sampling clock (v) which is generated by the clock generating circuit 29 when the phase is normal. An alternate long and short dash line in the diagrams shows a zero level of the sample value.

First, FIG. 7A shows the case where each of the sample values $q_1$ to $q_3$ has been sampled at a normal timing.

In this instance, the sample value $q_2$ is equal to the zero level. The zero level, accordingly, is supplied as a phase error signal (t) to the clock generating circuit 29. At this time, therefore, the clock generating circuit 29 generates the sampling clock (v) by the present phase.

FIG. 7B shows the case where each of the sample values $q_1$ to $q_3$ has been sampled at a timing earlier than the normal position.

At this time, the sample value $q_2$ is set to a negative value smaller than the zero level. The negative value, therefore, which is smaller than the zero level by only the sample value $q_2$ is supplied as a phase error signal (t) to the clock generating circuit 29. In this instance, the clock generating circuit 29, therefore, generates the sampling clock (v) whose phase was delayed by only an amount corresponding to the sample value $q_2$, thereby correcting a phase advance of the clock.

FIG. 7C shows the case where each of the sample values $q_1$ to $q_3$ has been sampled at a timing that is later than the normal position.

At this time, the sample value $q_2$ is set to a positive value larger than the zero level. The positive value which is larger than the zero level by only the sample value $q_2$ is, accordingly, supplied as a phase error signal (t) to the clock generating circuit 29. In this instance, therefore, the clock generating circuit 29 generates the sampling clock (v) whose phase was advanced by only an amount corresponding to the sample value $q_2$, thereby correcting the phase delay of the clock.

FIG. 7D subsequently shows the case where each of the sample values $q_7$ to $q_9$ has been sampled at a normal timing.

At this time, the sample value $q_8$ is equal to the zero level shown by an alternate long and short dash line. A level change in the sequence of the sample values $q_7$ to $q_9$ has a falling tendency. The polarity inverted value of the zero level, namely, the same zero level is, therefore, supplied as a phase error signal (t) to the clock generating circuit 29. At this time, the clock generating circuit 29, therefore, generates the sampling clock (v) by the present phase.

FIG. 7E shows the case where each of the sample values $q_7$ to $q_9$ has been sampled at a timing earlier than the normal position.

In this instance, the sample value $q_8$ is set to a positive value larger than the zero level. The level change in sequence of the sample values $q_7$ to $q_9$ has a falling tendency. The signal obtained by inverting the polarity of the sample value $q_8$, namely, the negative value which is smaller than the zero level by only the sample value $q_8$ is supplied as a phase error signal (t) to the clock generating circuit 29. In this instance, therefore, the clock generating circuit 29 generates the sampling clock (v) whose phase was delayed by only a value corresponding to the sample value $q_8$, thereby correcting the phase advance of the clock.

FIG. 7F finally shows the case where each of the sample values $q_7$ to $q_9$ has been sampled at a timing later than the normal position.

At this time, the sample value $q_8$ has a negative value smaller than the zero level. The level change in sequence of the sample values $q_7$ to $q_9$ has a falling tendency. The signal obtained by inverting the polarity of the sample value $q_8$, namely, the positive value larger than the zero level by only the sample value $q_8$ is supplied as a phase error signal (t) to the clock generating circuit 29. In this instance, therefore, the clock generating circuit 29 generates the sampling clock (v) whose phase was advanced by only an amount corresponding to the sample value $q_8$, thereby correcting the phase delay of the clock.

In the polarity switching circuit 28, when the sample value level of the sample value sequence has a rising tendency, the extracted sample value (r) supplied from the sample value extracting circuit 27 is supplied to the clock generating circuit 29 as a phase error signal (t) as it is. When the sample value level of the sample value sequence has a falling tendency, the inversion extracted sample value obtained by inverting the polarity of the extracted sample value (r) is supplied as a phase error signal (t) to the clock generating circuit 29. The conditions for the polarity inversion, however, are properly set in accordance with the signal processing method of the clock generating circuit 29.

For example, in case of employing an inversion integrating circuit configured in such a way that the LPF 52 of the clock generating circuit 29 inverts the polarity of the input signal and produces the resultant signal, the polarity switching circuit 28 operates in the following way. When the sample value level of the sample value sequence has a rising tendency, the polarity switching circuit 28 supplies the inversion extracted sample value obtained by inverting the polarity of the extracted sample value (r) to the clock generating circuit 29 as a phase error signal (t). When the sample value level has a falling tendency, on the contrary, the polarity switching circuit 28 supplies the extracted sample value (r) to the clock generating circuit 29 as a phase error signal (t) as it is.

In the embodiment shown in FIG. 3, although an example of the internal construction of the sample value extracting circuit 27 has been shown, a circuit with an internal construction as shown in FIG. 8 can be also used as a sample value extracting circuit 27.

Figure 9:
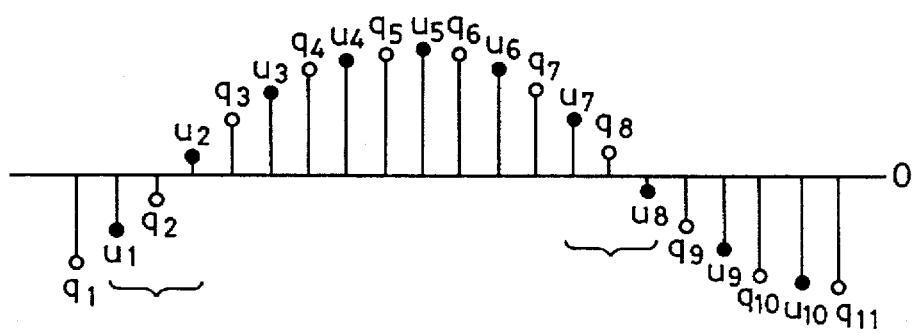
FIG. 9 is a diagram showing an example of sample values (q) and average sample values (u).

In FIG. 8, an adder 82 adds the sample value (q) which is supplied from the A/D converter 25 and a delayed sample value which has been delayed by a time of only one sampling clock by a D flip-flop 81. By the adding operation, as shown in FIG. 9, the adder 82 obtains an average sample value (u) of every two adjacent sample values (q). In FIG. 9, the sample value (q) is shown by a blank circle and the average sample value (u) is shown by a black circle. A sequence of the average sample values (u) is obtained by performing a linear interpolation for the sequence of the sample values (q).

The exclusive OR circuit 37 supplies an enable signal of a logic value "1" to each of the D flip-flops 36 and 38 in the case where a logic value of the MSB (most significant bit) of the average sample value (u) doesn't coincide with a logic value of the MSB of the average sample value (u) which has been delayed by the D flip-flop 83 by a time of one sampling clock. When those logic values are equal, the exclusive OR circuit 37 supplies an enable signal of a logic value "0" to each of the D flip-flops 36 and 38. In this state, when those logic values don't coincide, it means that the average sample value (u) is shifted from the positive value to the negative value or from the negative value to the positive value, namely, it means that the apparatus is in what is called a zero-cross state. The exclusive OR circuit 37 operates as zero-cross detecting means for supplying the enable signal of the logic value "1" to each of the D flip-flops 36 and 38 when the zero-cross state is detected.

Only when the enable signal of the logic value "1" is supplied from the exclusive OR circuit 37, the D flip-flop 36 fetches the delayed sample value supplied from the D flip-flop 81 and generates it as an extracted sample value (r).

Only when the enable signal of the logic value "1" is supplied from the exclusive OR circuit 37, the D flip-flop 38 fetches the MSB of the average sample value (u) supplied from the D flip-flop 83 and generates it as a slant signal (s). In the case where the average sample value (u) is shifted from the positive value to the negative value, namely, when the shift change of the average sample value (u) has a falling tendency, the signal logic value of the slant signal (s) is set to "1". When the average sample value (u) is shifted from the negative value to the positive value, that is, when the shift change of the average sample value (u) has a rising tendency, the signal logic value of the slant signal (s) is set to "0".

Namely, in the sample value extracting circuit 27 with the construction shown in FIG. 8, a zero-cross interval during which the average sample value (u) shown by a black painted circle in FIG. 9 is shifted from the positive value to the negative value or from the negative value to the positive value is detected, and the sample values (q) existing in such an interval are produced as extracted sample values (r).

In the digital signal reproducing apparatus according to the invention as mentioned above, the sample value near the zero level is extracted from the sample value sequence obtained by sampling the read signal. When the sample value level of the sample value sequence has a rising tendency, the sampling clock whose phase is corrected on the basis of one of the extracted sample value and the inversion extracted sample value obtained by inverting the polarity of the extracted sample value is generated. When the sample value level of the sample value sequence has a falling tendency, the sampling clock whose phase is corrected on the basis of the other one of the extracted sample value and the inversion extracted sample value is generated.

In the above construction, since the sampling clock is formed on the basis of the sample value after completion of the A/D conversion, the sampling clock whose phase is corrected so that the sample value is set at the optimum timing for the data decoding can be obtained.

Further, since the phase of the sampling clock is corrected on the basis of the sample value synchronized with the sampling clock, the problem such that the phase precision deteriorates due to an influence by the circuit delay due to a temperature change or the like is also solved.

According to the digital signal reproducing apparatus according to the invention, the digital signal can be reproduced by the sampling clock which is accurately synchronized with the phase of the read signal, so that the reproduction of the digital signal is performed in a desirable state.

What is claimed is:

1. A digital signal reproducing apparatus for reproducing a digital signal from a read signal read out from a recording medium on which the digital signal is recorded, comprising:

an A/D converter for obtaining a sample value sequence by sequentially sampling said read signal by sampling clocks;

decoding means for decoding said digital signal from said sample value sequence and for generating the decoded digital signal as a reproduction digital signal;

sample extracting means for extracting a sample value near a zero level from each sample value in said sample value sequence and for obtaining it as an extracted sample value;

polarity switching means for setting one of said extracted sample value and an inversion extracted sample value obtained by inverting a polarity of said extracted sample value to a phase error signal when a sample value level of said sample value sequence has a rising tendency and for setting the other one of said extracted sample value and said inversion extracted sample value to said phase error signal when the sample value level of said sample value sequence has a falling tendency; and clock generating means for generating, as said sampling clock, a clock signal whose phase is corrected on the basis of said phase error signal.

2. An apparatus according to claim 1, wherein said sample extracting means has zero-cross detecting means for detecting a zero-cross interval in which each sample value in said sample value sequence is shifted in one of manners of shift from a negative value to a positive value and from a positive value to a negative value, a sample value that is nearest to the zero level in said zero-cross interval is extracted from said sample value sequence and is used as said extracted sample value.

3. An apparatus according to claim 1, wherein said sample extracting means has means for obtaining an average sample value sequence by successively obtaining an average value between two adjacent samples in said sample value sequence and extracts a sample value existing in a zero-cross interval during which each average sample value in said average sample value sequence is shifted in one of manners of shift from a negative value to a positive value and from a positive value to a negative value, from said sample value sequence and uses said sample value as said extracted sample value.

4. An apparatus according to claim 1, wherein said decoding means is a Viterbi decoder.

* * * * *